Dec. 1, 1942.  R. L. CARR  2,303,788
VEHICLE BODY
Filed Nov. 30, 1939  7 Sheets-Sheet 1
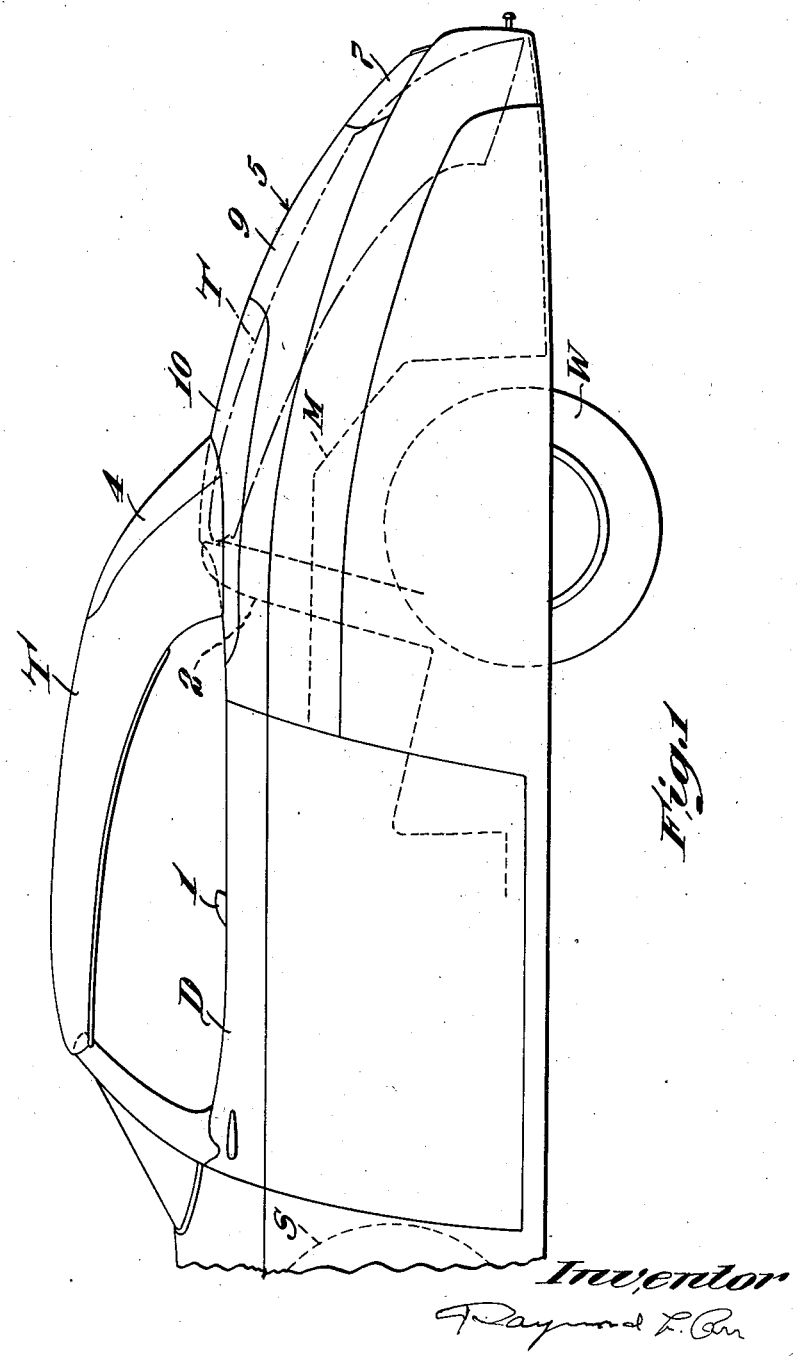
Inventor
Raymond L. Carr

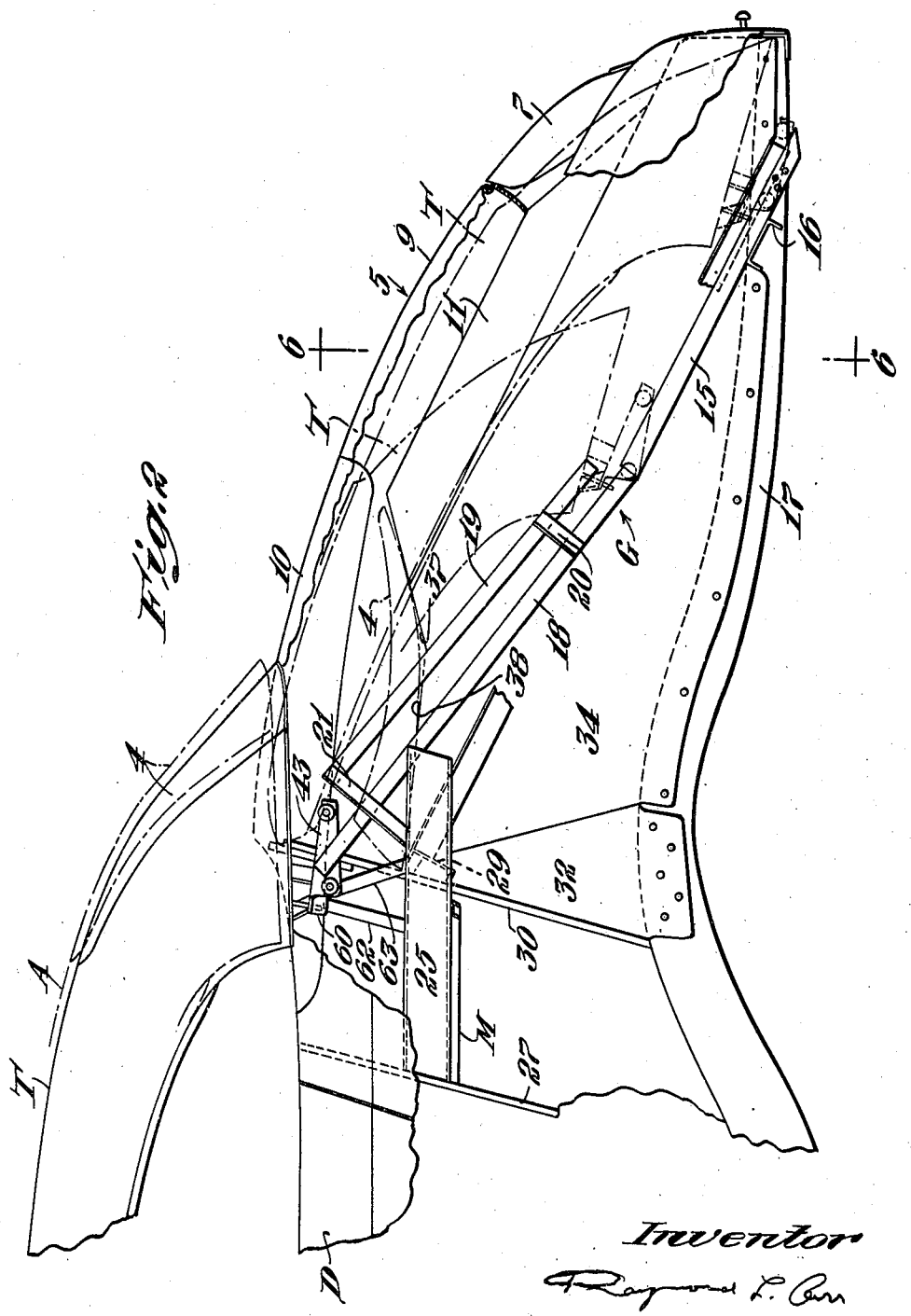

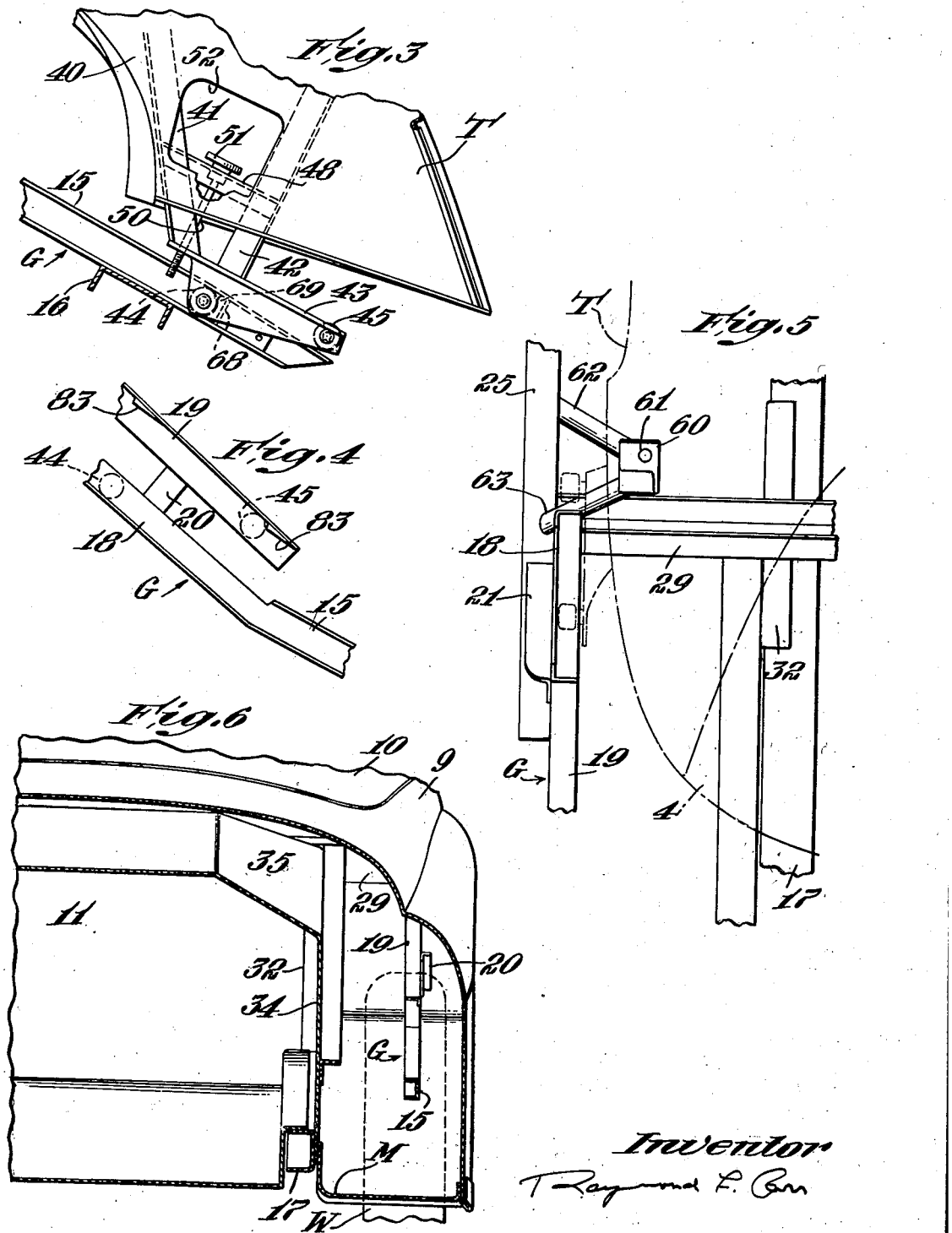

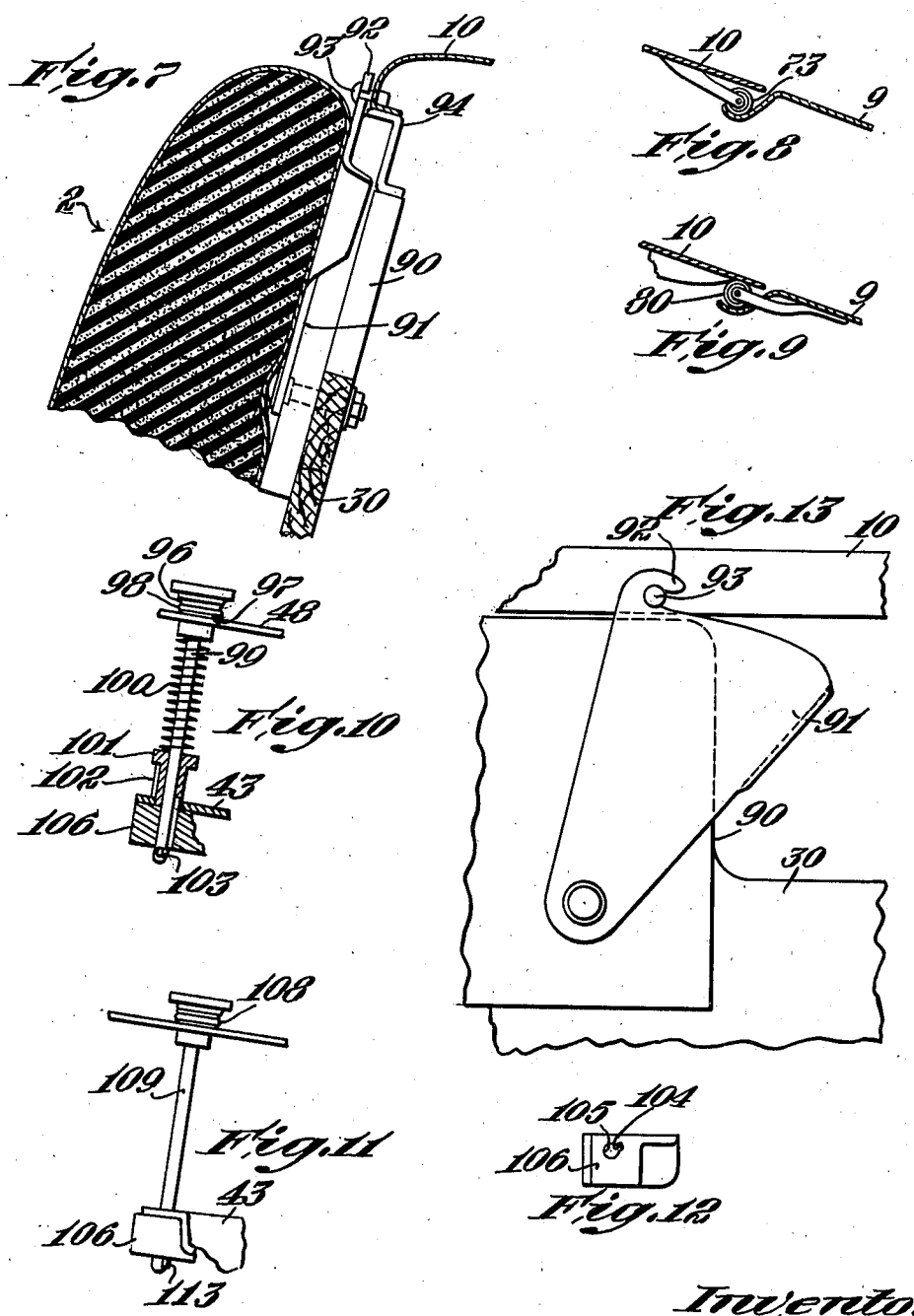

Dec. 1, 1942.   R. L. CARR   2,303,788
VEHICLE BODY
Filed Nov. 30, 1939    7 Sheets-Sheet 5
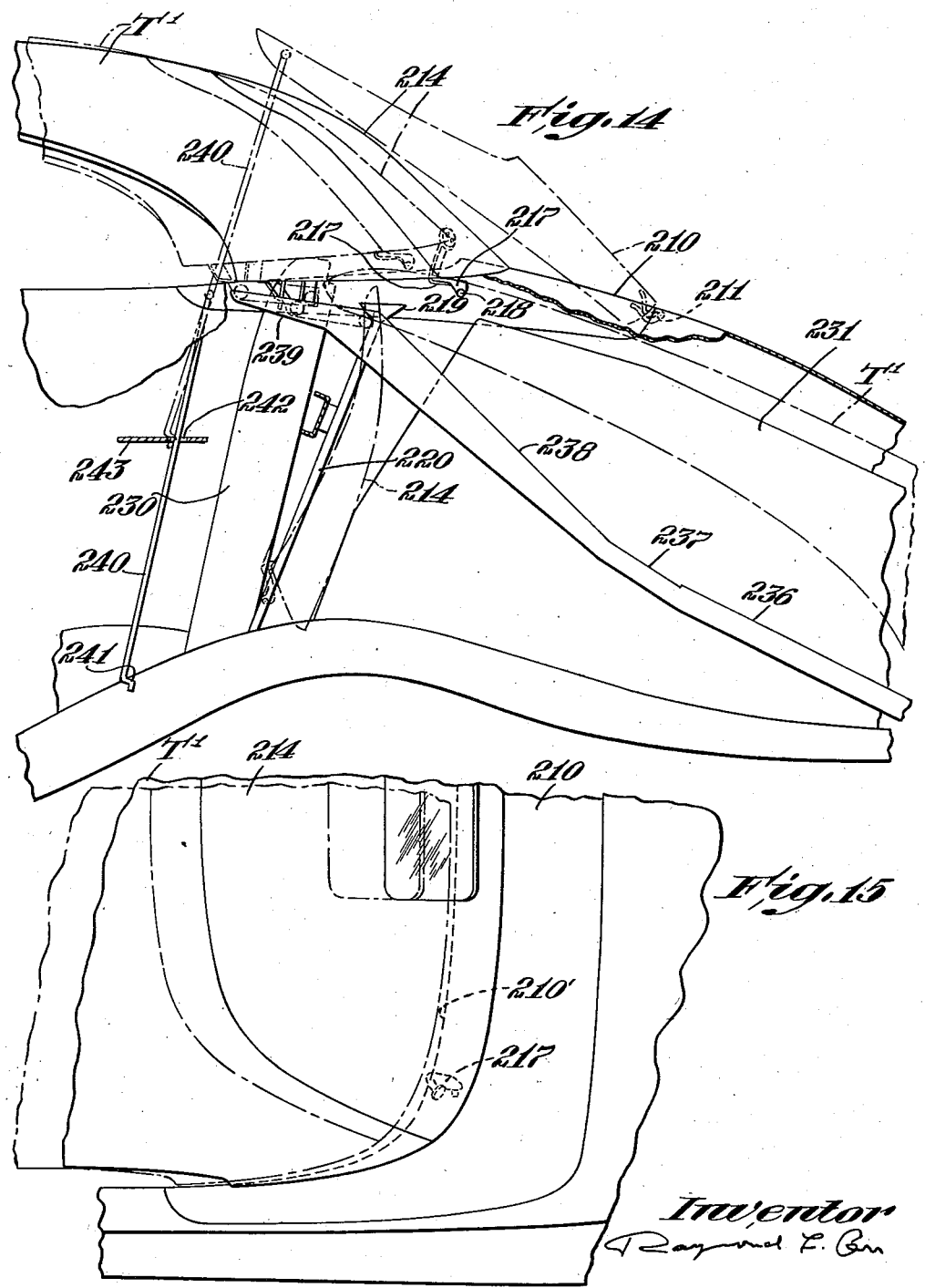

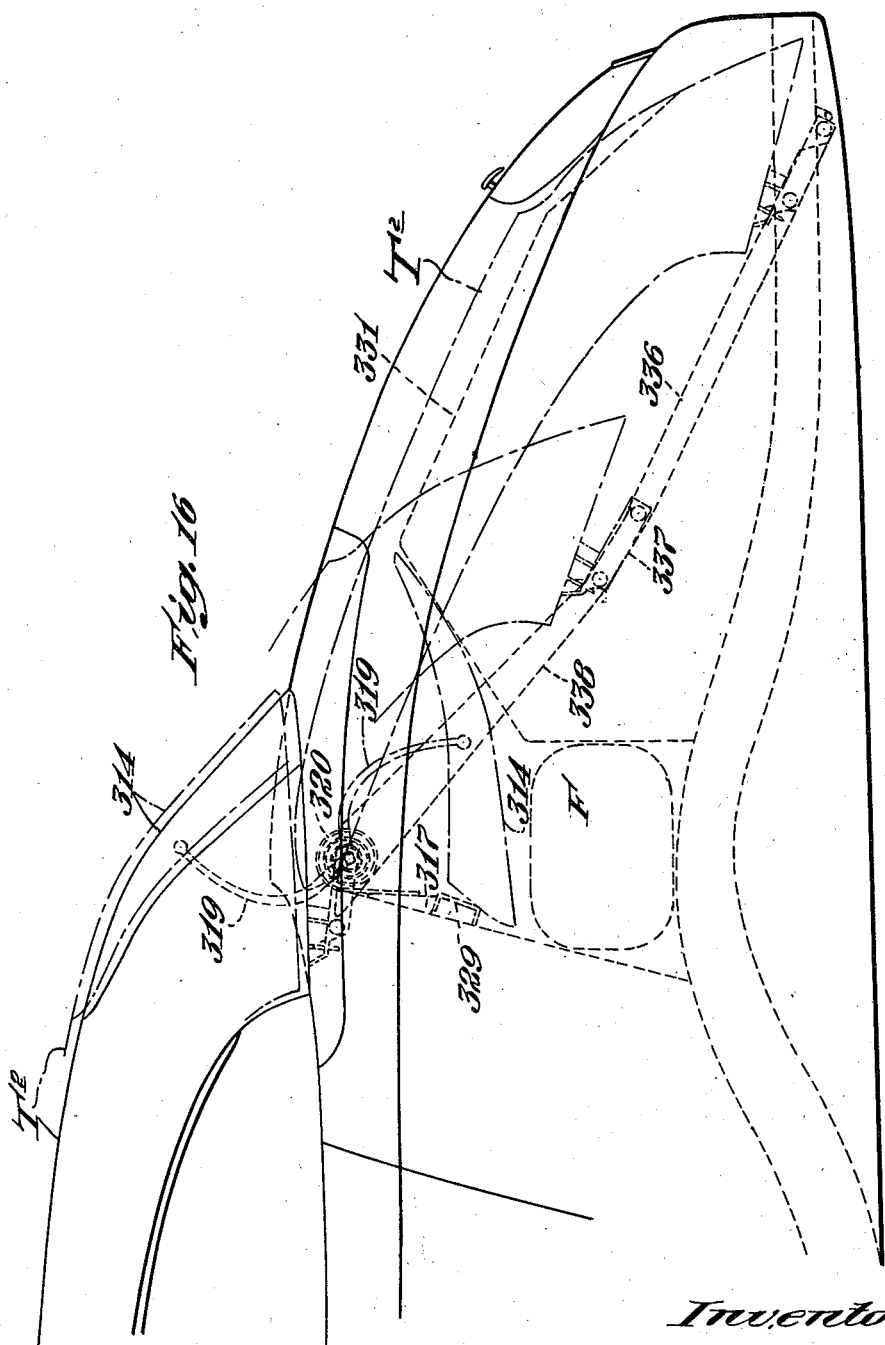

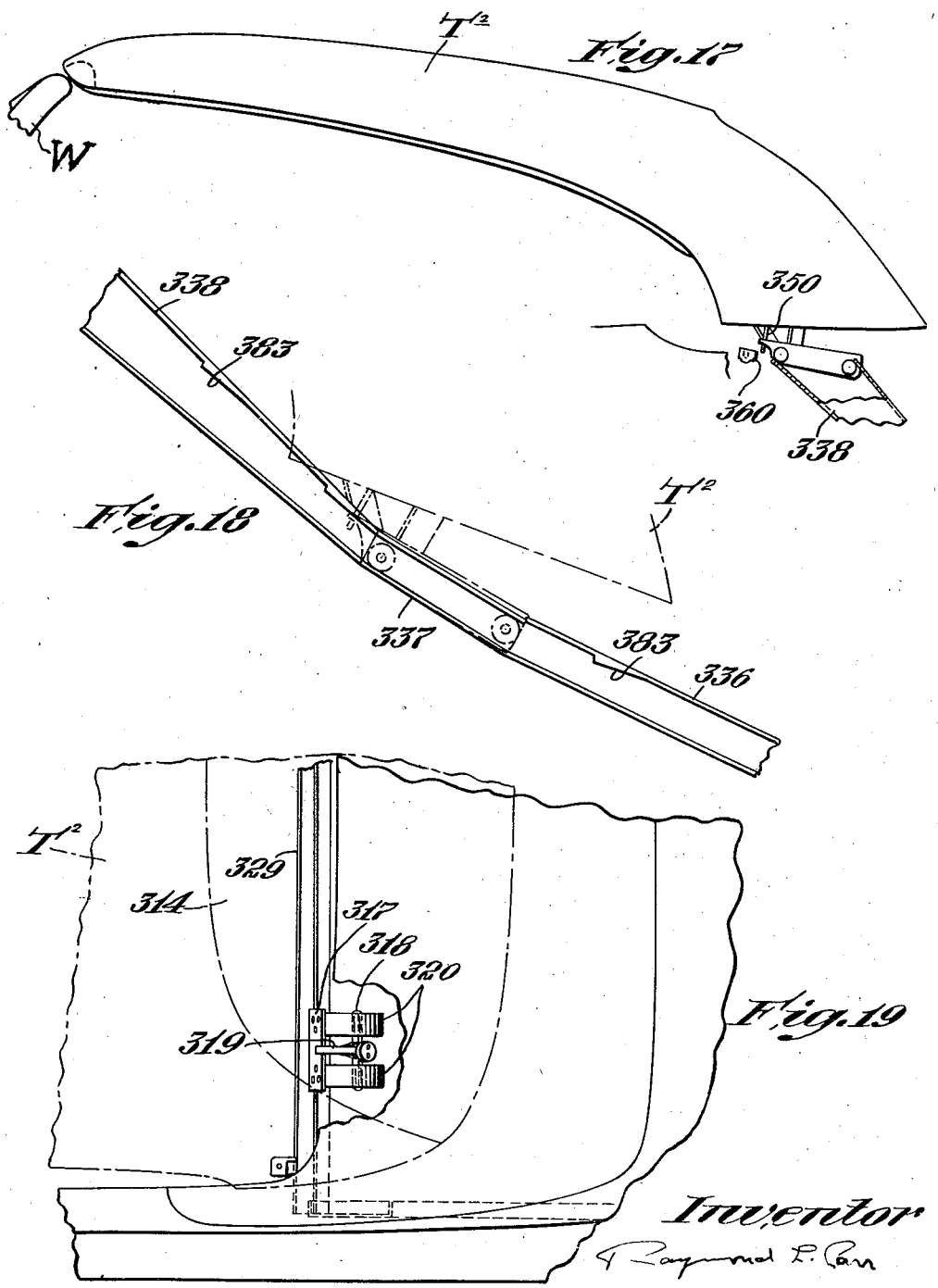

Patented Dec. 1, 1942

2,303,788

UNITED STATES PATENT OFFICE 2,303,788

VEHICLE BODY

Raymond L. Carr, Boston, Mass.

Application November 30, 1939, Serial No. 306,794

8 Claims. (Cl. 296—107)

This invention relates to improved vehicle bodies of the type disclosed in my copending application Serial No. 35,610, filed August 10, 1935. Such a body is characterized by a rigid shell (hereinafter often referred to as a matter of convenience as the top) which is lowerable into the rear deck of the vehicle, the shell, in its lowered position, being inclined upwardly and forwardly relative to its raised position and being arranged in generally nested position within the deck.

Preferably the top is arranged so that it may be guided between its raised and lowered positions by suitable generally inclined guides located at opposite sides of the deck. Such an arrangement is particularly advantageous, since it permits the top to move through a restricted opening at the front of the deck and permits the deck to include a fixed panel behind this opening.

The present invention particularly provides improved guiding and supporting structure for the movable shell of the top. Thus the present invention affords an arrangement particularly effective at the lower part of the path of the shell in constraining the latter so that it may not be swung into engagement with the fixed portion of the deck wall. This structure also preferably is arranged so that the front of the shell must definitely move over the windshield standards. Thus possibility of bumping the front of the top against the rear of the standards is avoided. The guiding and supporting structure preferably includes suitable guides within the deck and rolls at each side of the top arranged to permit these desirable results, the axes of the rolls, however, being fixed relative to the shell, thus avoiding complication and possible loosening of parts.

A further important aspect of the invention involves the arrangement of the supporting and guiding structure for the shell so that the latter may be temporarily supported in a position beyond its normal raised position. The shell passes through an opening at the front of the deck as it moves between its raised and lowered positions, and a movable lid may be provided for normally closing this opening. When the shell is supported in its temporary position, adequate clearance is provided to permit movement of the lid to cover or uncover the opening. As disclosed herein the lid may either be movable substantially in its own plane or may be swingable. Not only may the supporting and guiding structure be arranged to hold the shell in a temporary position, for example, above its normal raised position, but also the structure may be effective in facilitating the movement of the shell into its temporary position. For example, suitable yieldable means or suitable screw-threaded parts may be provided to move the shell from normal raised position to the temporary elevated position.

A further feature of the invention involves the arrangement of the supporting structure so that the front portion of the lowered shell extends somewhat over the back of the rear seat. Accordingly the seat may form part of the supporting structure for the lowered top.

When a manually movable shell is provided, some means is desirable for preventing too rapid movement of the shell into its lowered position under the action of gravity. In the lower part of its path, the shell may be arranged frictionally to engage the seat back, if it is released by the operator, so that its downward movement is retarded. However, the present invention provides an arrangement positively guiding the shell in the upper part of its path so that it moves over the windshield standards. With such a guiding arrangement, it is desirable to provide suitable means to impede downward movement of the shell, particularly if released from the grasp of the person lowering the same; such means being provided by the present invention.

The guides preferably have rear portions defining the lower part of the path of the shell, which are inclined upwardly and forwardly, and preferably have front portions more steeply inclined. Such an arrangement is particularly advantageous in permitting the shell to move past the front edge of the fixed wall section of the deck and in permitting the opening at the front of the deck to have a moderate longitudinal extent. The guide at each side of the deck preferably provides parallel flanges to define the lower part of the path of the top and upwardly diverging flanges to define the upper part of this path. Preferably the guides are arranged outwardly of the path of the shell and these guides extend into spaces behind the rear wheels of the vehicle, these spaces being provided by housings extending beside opposite sides of the deck. Accordingly the rear of the space which receives the top structure may be relatively wide, yet the deck surface may appear to decrease in width toward the rear, so that an objectionably bulky appearance is avoided.

I have also disclosed herein an arrangement of a movable rear panel for the top mounted so that it may be swung to lowered position while being definitely guided and partially counterbalanced. In accordance with this invention such an arrangement may be employed even when the top, including the rear panel, is movable upwardly to a temporary elevated position above the normal raised position.

The above and further objects and advantageous features of the invention will be apparent to those skilled in the art upon a reading of the subjoined description and claims in conjunction with the accompanying drawings, in which Fig. 1 is a side elevation of the rear portion of a vehicle body exemplifying the principles of the present invention;

Fig. 2 is an elevational view, on a larger scale, of the rear deck and adjoining parts, with parts broken away and shown in section;

Fig. 3 is an elevational detail of the inside of one side of the lowered top, also showing a portion of the guiding means and a supporting part in section;

Fig. 4 is an elevational detail of a portion of the guiding means shown in Fig. 2;

Fig. 5 is a plan view of the upper portion of the guiding and supporting structure and related parts, the position of a portion of the raised top being indicated by dot and dash lines;

Fig. 6 is a section on the plane indicated by line 6—6 of Fig. 2;

Fig. 7 is a central vertical section showing the upper portion of the seat back, the front edge of the lid and related parts;

Figs. 8 and 9 are sectional details of the rear of the lid and the front of the fixed deck wall;

Fig. 10 is a sectional detail of an optional arrangement for locking the rear of the top in normal position and elevating the same to temporary position;

Fig. 11 is a similar view of another form of locking and supporting means;

Fig. 12 is a plan view of a portion of the assembly shown in Fig. 10;

Fig. 13 is a view of a portion of the seat back shown in Fig. 7, the upholstery being removed;

Fig. 14 is an elevational detail of a portion of a vehicle body showing an optional arrangement of top supporting and guiding structure, parts being broken away and shown in section;

Fig. 15 is a plan view of a portion of the structure shown in Fig. 14, the top being shown in its temporary position by dot and dash lines;

Fig. 16 is a side elevation of another embodiment of the invention, parts being shown in various positions in dot and dash lines;

Fig. 17 is a diagrammatic view of a portion of the structure disclosed in Fig. 16 and showing the manner in which the shell is positively guided over the windshield;

Fig. 18 is an elevational detail of a portion of the guiding means shown in Fig. 17, a portion of the top being indicated by dot and dash lines; and Fig. 19 is a top view of a portion of the structure shown in Fig. 16, the position of the raised top being indicated by dot and dash lines.

A vehicle body exemplifying the principles of the present invention is shown in Fig. 1. Such a body, for example, may have a front seat 1 and a rear seat 2 and may be provided with a top including a body portion or shell T, hereinafter often referred to as the top. The top may also comprise a detachable rear panel 4.

As shown in dot and dash lines in Fig. 1, the shell T in its lowered position is inclined upwardly and forwardly relative to its raised position and is disposed in roughly parallel or generally nested relation to the outer wall of deck 5. This wall may comprise a rear door 7 for affording access to an interior storage compartment, a central fixed section 9 and a movable front lid 10 over which the rear of the raised top normally fits. As shown, the body may preferably, although not necessarily, have elongate housings at its side which provide lateral extensions of the doors D and which enclose the upper parts of rear wheels W as well as extending substantially behind the same. An elongate housing of this character may also provide an enclosure for the spare tire S, a portion of which is indicated in dotted lines in Fig. 1. When the front of the door D is relatively close to the front wheels, this tire may be disposed in a plane inclined inwardly and forwardly relative to the longitudinal central plane of the vehicle to permit adequate clearance between the corresponding front wheel and the tire-supporting structure. An arrangement of this character permits the spare tire to be carried in concealed position without occupying a substantial portion of the rear storage space.

Behind door D the mud guard M, indicated by dotted lines in Fig. 1, may extend horizontally from the door jamb over the mid-portion of wheel W, and may also have inclined and substantially vertical portions, as well as a lower, nearly horizontal extension at the lower part of the rear of the elongate housing. Thus, spaces are provided behind the wheels to receive parts of the lowered top structure, while the deck proper may decrease in width toward the rear.

Within the deck 5, as is apparent from Fig. 2, there is a storage compartment 11 accessible through door 7, this compartment being straddled by the lowered top T.

At each side of the deck, I provide suitable, generally inclined guides G, one of which is shown in Fig. 2. As is evident from Figs. 2 and 4, the lower part of such a guide comprises an upwardly inclined channel 15. The lower end of this channel is supported on a bracket 16 extending outwardly from the side rail 17 of the chassis frame. The bight portion of channel 15 is disposed outwardly and its upper and lower flanges project inwardly toward the chassis side rail. Thus this channel is adapted to provide a track for a suitable roll on the top, which will be described.

The upper end of the channel 15 is secured, as by welding, to a more steeply inclined guide member 18 in the form of an angle, which provides a flange disposed in a vertical plane and a flange at right angles thereto extending inwardly toward the compartment 11. Disposed above the angle 18 is a second angle 19 with a depending rather than an upstanding flange. A suitable bar 20 may hold the lower ends of the angles 18 and 19 in properly spaced relation, while a supporting bar 21 may be arranged to support the upper ends of these angles. As shown, the angle 19 may incline upwardly somewhat more steeply than the angle 18, thus diverging from the latter in an upward direction.

Any suitable supporting structure may be provided for the upper parts of the guide G and to support the rear part of the top in its raised position. For this purpose, however, I prefer to provide at each side of the vehicle a horizontal frame member 25 such as a member of channel or box-like section, the front end of which is secured to the door jamb 27. A transverse frame member 29 may extend between the members 25 at opposite sides of the vehicle, preferably being disposed behind the panel 30 which defines the back of the rear seat and affords the front wall of the baggage compartment. The cross-member 29 preferably may be supported at each side of the vehicle by an upstanding member 32, the lower part of which is secured to the chassis side rail 17.

Preferably the outer face of the bracket 32 may be in substantially coplanar relationship to the outer face of the chassis side rail, and the outer wall of the lower portion of the baggage compartment 11 (this wall being designated by numeral 34) may be secured to the bracket 32 and to the outer face of the rail 17. The upper part of the storage compartment 11 is provided with upwardly and inwardly inclined side wall portions 35 (Fig. 6) so that the upper part of the compartment may be straddled by the upper and narrower part of the opening at the rear of the top T. The front of the upper part of the compartment is provided with a downwardly and forwardly inclined wall 37 and a cooperating, substantially horizontal wall 38, these walls providing a suitable support for the lowered rear panel 4 of the top, as shown in dot and dash lines in Fig. 2.

Fig. 3 shows the construction of the supporting bracket at the side of the shell and of the associated rolls. As shown, for example, the rear part of the top may be provided at each side with an inner wall 40 to which angle members 41 and 42 are secured, the lower ends of these members extending downwardly below the lower edge of the wall and being secured as by welding to a member 43 which rotatably supports a front roll 44 and a rear roll 45. The member 43 preferably may be in the general form of an angle, the upper flange of which is secured to the angles 41 and 42 and the vertically disposed flange of which decreases in height toward the rear of the top and supports the axial elements of the rolls 44 and 45.

Preferably, as shown, these rolls are spaced at a rather substantial distance from each other and the lower part of the vertical flange of the member 43 extends downwardly slightly beyond these rolls. This arrangement provides a depending flange at each side of the top which normally moves in close juxtaposition to the edge of the lower flange of the angle 18 or lower flange of the channel 15.

A connecting member 48 preferably extends between the angles 41 and 42 above the lower edge of the top, and a hand screw 50 is rotatably mounted on this member 48, being provided with a knob 51 accessible through an opening 52 in the inner wall 40 of the top. This screw preferably extends through an opening in the upper flange of member 43 and has a threaded lower portion for engagement with a suitable supporting bracket on the body. Such a bracket may comprise a block 60 having an upper surface which has a moderate inclination upwardly and forwardly, this block being provided with a threaded opening 61 to receive the threaded end of hold-down screw 50. The block 60 may conveniently be supported on tubular members 62 and 63 which extend upwardly from the frame member 25. Preferably the upper end of the angle 18 is so positioned that the end of the screw 50 will drop upon the rear margin of the upper surface of the block 60 as the roll 44 leaves the angle 18.

In this position of the top, which is shown in dot and dash lines in Fig. 2 and identified by the reference character A, the top is in a temporary elevated position above its normal raised position. The positioning of the top in its elevated position permits the convenient movement of the panel 10 substantially in its own plane.

Fig. 3 shows in greater detail the construction at the lower end of the channel 15. The latter is provided with a transverse member 68 which supports a rubber bumper 69 engageable with the corresponding front roller 44. Behind this bumper the upper flange of the channel inclines downwardly relative to the lower flange thereof for a reason which will be described.

Any suitable means may be provided at the front edge of the fixed deck section 9 and at the rear of the lid 10 to permit the convenient movement of the lid substantially in its own plane to a position over the fixed deck section 9. For example, as shown in Fig. 8, the rear part of the lid may have a rubber covered roller 73 of small diameter rotatably mounted thereon and movable over the intermediate portion of the fixed deck section. In the normal position of the lid 10, this roller may be disposed in a trough-like extension of the deck section 9; this extension providing a rearwardly extending surface over which the roller may pass in moving into the outer surface of the section 9. To cooperate with this roller, I may also provide rollers 80 (Fig. 9) at either side thereof engageable with lower surfaces of the lid 10 and thus aiding to guide the front of the latter as the same is moved rearwardly.

At the central portion of the back of the rear seat, I preferably provide retaining means for the lid 10, such retaining means being particularly desirable when the top is lowered. As shown in Figs. 7 and 13, the back of the seat may be cut away to provide a recess 90. Similar swinging members 91 may be pivotally mounted on the seat back at each side of this opening and may be provided with hook-like portions 92 engageable with studs 93 on the front flange of the lid 10. The parts 91 are so arranged that the person desiring to unfasten the lid merely has to insert the hand behind the flexible upper portion of the cushion for the seat back and engage both of the members 91 simultaneously to move them out of their operative positions. Incidentally Fig. 7 also discloses the arrangement of a rabbet at the upper part of the seat back, which is provided with a rubber covering 94 and is adapted to receive the front or nose portion of the shell to afford a support for the same.

When a top of the type shown herein is in its raised position and it is desired to lower the same, the fastenings which secure the front corners of the top to the windshield standards may first be loosened and the hand-screws 50 may then be actuated, rotation of these screws releasing the shell from the blocks 60 and moving the rear of the shell to its elevated position. Thus, under these conditions the elements 50 act as jackscrews to lift the rear of the top. With the top in this position, the lid 10 may then be pushed rearwardly over the fixed section 9 to uncover the opening through which the top is to pass. The rear panel 4, which may be secured to the shell by any suitable fastening means, is then disconnected from the shell, the panel 4 then being disposed on the wall sections 37 and 38 of the storage compartment 11 in the position shown in dotted lines in Fig. 2. Preferably the panels 37 and 38 may be covered with suitable cushioning material to avoid scratching of the lowered rear panel 4.

After the latter has been properly located within the deck in the manner described, the body portion of the top may be moved downwardly. The first movement of the top involves the lifting of the front thereof from the windshield standards and the sliding of the lower ends of the screws 50 over the upper surfaces of the blocks 60 until the rolls 44 engage the angles 18. Thereupon the top may be rolled downwardly with the rolls 44 supported on the angles 18 and with the rolls 45 juxtaposed to or engaging the angles 19.

Under such conditions, it is desirable to impede downward movement of the top under the influence of gravity if the top is released. For this purpose I prefer to provide a plurality of elements 83 on the upper flanges of the rails 19, which elements have front faces which are steeply inclined relative to the corresponding flange of the angle and the rear faces of which have a slight inclination relative to the flange of the angle. Thus, as the top moves downwardly, and if the same is released, the steeply inclined front face of a member 83 will act as a stop or abutment surface to prevent rolling movement of the roll 45. Preferably the members 83 are disposed in corresponding positions upon the angles 19 at each side of the deck. Since the center of gravity of the top is substantially in front of each roll 44, the members 83, at opposite sides of the vehicle, may thus be effective in entirely stopping or in very materially reducing the velocity of the downwardly moving top. On the other hand, during normal manipulation of the top there is a tendency to raise the front end thereof upwardly to permit the roll 45 to pass beneath the members 83, so that the top is being supported and guided substantially by the lower rolls 44.

As the top continues its downward movement, the rolls 45 pass out of engagement with the angles 19 and pass into the region above the upper ends of the channels 15. As the top continues its downward movement, the rolls 44 are then received in the upper ends of the channels 15. When the top is in this portion of its path, there could only be a limited variation in its angular position relative to the guides G without having it engage the front edge of the fixed panel 9. Under these conditions, however, if there is a tendency to swing the top upwardly relatively to the guides G, the rolls 45 engage the upper surfaces of the upper flanges of channels 15 while the rolls 44 may engage the lower surfaces of these flanges. These flanges therefore prevent the swinging of the top upwardly to an angular position which would result in its engaging the front of the fixed deck section 9.

As the top approaches its lowered position, the rolls 44 engage the rubber blocks 69 as stops, and the front of the top may be received in the rubber-lined rabbet at the upper part of the panel 30. Thereupon the lid 10 may be returned to its normal position.

When it is desired to raise the top T, the lid 10 is moved back to a position over the fixed section 9 of the deck. The nose of the top is lifted so that the top is swung in a clockwise direction, as viewed in Fig. 2, about the rolls 44. A limited swinging movement of this character can take place due to the inclination of the upper flanges of the channels 15 at the lower ends of the channels. Thus the nose of the top may be moved upwardly over the upper part of the rear seat back. As this movement occurs, the upper flange of the channel 15 prevents engagement of the top with the fixed section 9. During this part of the path of the top, if the same is released, the nose may drop onto the soft portion of the rear seat cushion, which acts as an effective brake to impede downward movement of the top under gravity.

As the top continues its upward movement, the upper flange of each channel 15 aids in preventing the swinging of the top to a too great degree relative to the guide means G and thus prevents engagement of the top with the front edge of the fixed deck section. As the upward movement of the top continues, the opening in the rear thereof reaches a position in front of the panel 9 and the rolls 45 pass beneath the upper flanges of angles 19. Under these conditions, the rolls 45 can readily roll over the long, gradually inclined surfaces of the elements 83. However, the upper flanges of the angles 19 are effective in causing the nose portion of the top to rise above its normal position as the top approaches its raised position. Thus the nose of the top is positively guided over portions of the windshield standards.

After the nose of the top has reached such a position, the rolls 45 leave the front ends of the angles 19 and the front of the top swings downwardly so that it rests and may slide on the upper ends of the windshield standards. The rolls 44, however, continue to engage the corresponding angles 18 until the lower ends of the hand screws 50 reach positions over the blocks 60, whereupon the rolls 44 leave the angles 18 and the rear of the top is supported on the blocks 60 but in its elevated position.

When the shell is in this position, the rear panel 4 may be moved out of the deck and secured to the shell. The lid 10 may then be rolled forward and secured in its normal position. Thereupon the elements 50 may be screwed downwardly to lower the top from its elevated position to its normal raised position and to press brackets 43 firmly onto blocks 60.

Fig. 10 discloses an optional hold-down and elevating device which may be substituted for the screw-threaded fastening 50. Such a device 99 may extend through the connecting member 48 and through the top bracket 43, being provided with a pair of metal washers 96 and 97 spaced by a rubber washer 98 and arranged between the upper manually actuable knob of the device and the cross member 48. Thus a limited tilting movement of the member 99 relative to the top may take place when, for example, one side of the rear of the top is moved to elevated position before the other side thereof.

A coil spring 100 is arranged about the member 99. Slidably mounted on the bracket 43 of the top is a bushing 101 which is urged downwardly by the spring 100 and which is provided with a spline 102 slidable in the part 43. The lower part of the member 99 is provided with a protuberance 103 which moves downwardly through a groove 104 provided by the opening 105 of the holddown block 106 (Fig. 12) which is adapted to support the top. When the top is locked in its normal raised position, the protuberance 103 is turned out of registration with the groove 104, as indicated for example in Fig. 10. Thus the top is positively held in position. Under this condition the spring 100 is compressed and presses the member 101 against the upper part of the block 106. When the handle of the member 99 is turned to bring the protuberance 103 into registration with groove 104, the spring 100 is effective in lifting the top, causing the member 101 to slide downwardly relative to the part 43 and thus causing the corresponding corner of the top to be elevated to a position wherein it is supported only by the member 101 and wherein the bracket 43 is spaced above the hold-down block 106.

Fig. 11 illustrates another optional hold-down arrangement wherein the member 109 is generally similar to the member 99, being provided with metal washers, corresponding to the washers 96 and 97, and with a rubber washer 108, corresponding to the washer 98. In this embodiment of the invention, however, the spring 100 is omitted and the top must be manually lifted to its temporary elevated position. However, when in this position, if the protuberance 113 is moved out of registration with the corresponding groove of the hold-down block 106, the top may be supported by the protuberance 113 engaging the upper surface of the hold-down block. Thus the top is positioned to permit movement of the lid 10.

Figs. 14 and 15 disclose an optional arrangement of the supporting and guiding structure for the shell T¹ which is provided with a rear panel 214. The latter may be movable downwardly to the position shown in dot and dash lines in Fig. 14, directly behind the rear seat 230 of the vehicle. Since the lowered panel 214 may be disposed in this position, the storage compartment 231 may be relatively large. In order to facilitate the movement of the panel 214 to its lowered position, each side thereof may be provided with a bracket 217 carrying a small roller 218 which may readily be inserted in the flared upper end 219 of a guide channel 220 extending downwardly at the rear of the seat.

The guides for the shell, which are employed with the type of assembly shown in Fig. 14, may be generally similar to those previously described, but the rolls on the shell may both move in the lower channel portion 236 of the corresponding guide. The latter may be provided with an intermediate channel portion 237 inclined upwardly somewhat more steeply than the portion 236. The upper part of each guide may be in the form of a channel 238 provided with upwardly diverging flanges. This channel may also be provided with a forwardly projecting extension 239 adapted to support the shell T¹ in a temporary position, indicated by dot and dash lines in Fig. 14, which is primarily ahead of but which may also be somewhat above the normal raised position of the top.

For this purpose the lower part of the extension 239 may have an upwardly and forwardly inclined surface, as shown, so that the front roll at each side of the top may move upwardly on this surface while the front of the top is being supported by the windshield.

A body of this type may be provided with a swinging lid 210 which extends beneath each side of the rear of the top and extends beneath the panel 214 when the top is in its normal position. Thus an effective weather-sealing arrangement is provided.

As shown in Fig. 15, when the top T¹ is moved to its temporary position, it is in front of the adjoining front or inner edge 210′ of the lid 210 so that the latter may readily swing upwardly about its hinges 211. To support the lid in its opened position, any suitable strut or toggle means may be provided, such as the bar 240 pivotally connected to the front of the lid at one side of the body and having an offset portion 241 engageable with the edge of an opening 242 in a suitable panel 243.

Figs. 16 to 19 illustrate another embodiment of the present invention, which includes a top shell T² provided with a rear panel 314. The body may be provided with a storage compartment 331, the fuel tank F preferably being located directly back of the rear seat and in front of the storage compartment, i. e., over the rear axle.

The guiding means shown in Figs. 16, 17 and 18 may be generally similar to those already described, comprising a lower channel 336, an intermediate channel portion 337, and an upper channel 338 with upwardly diverging flanges. As shown particularly in Fig. 19, the flanges of the intermediate channel 337 may be closer together than the corresponding flanges of the channel 336, the latter and the channel 338 being provided with elements 383 corresponding to the elements 83 of Fig. 4 to impede the downward movement of the top.

When the rolls on the shell T² are in the channel 337, the top may be in the intermediate position shown in dot and dash lines in Fig. 16, wherein the clearance between the upwardly moving top and the edges of the opening through which the same passes may be at the minimum. At this portion of its path (see Fig. 18), it is therefore desirable especially to constrain the top (for example even more than when the rolls are in the lower channel 336), so that the top will be prevented from moving into engagement with the front edge of the fixed wall of the deck.

It may also be noted that in this embodiment of the invention the rear roll at each side of the top moves out of the open lower end of the corresponding channel 336 and engages a suitable fixed stop when the shell moves into its lowered position.

Fig. 17 is particularly significant in that it illustrates diagrammatically the relationship of the top to the windshield standards W as the top approaches the upper end of its path. In this position the rolls on the top are positively prevented from swinging in an anti-clockwise direction as viewed in Fig. 17, so that the nose portion of the top is definitely moved above the windshield standards W before either of the rolls at one side of the top moves out of engagement with the corresponding flange. As the forward and upward movement of the shell is continued and the hold-down screw 359 moves onto the hold-down block 360, the front of the top, resting upon the windshield standards, can be slid into its normal position.

The embodiment of the invention shown in Figs. 16 to 19 also provides an arrangement of the panel 314 so that the latter may be definitely guided to its lowered position within the deck and so that it may be supported and, to an extent, counterbalanced as it moves between such positions. In general, arrangements of swinging panels and guiding means of this character are disclosed and claimed in my copending application Serial No. 306,795, filed on even date herewith.

However, the arrangement shown in Fig. 16 is particularly significant in that it provides a guiding arrangement which may be employed even when the top T² is moved upwardly to a temporary elevated position. For this purpose it is necessary to provide an articulated connection between the panel and its support which will permit the movement of the panel between its normal raised position and its elevated position. For this purpose I prefer to employ spiral springs 320; for example, two of these springs may be employed at each side of the panel 314. These springs preferably are secured to fixed brackets 317 disposed at the rear of the back seat and have inner or central portions engaged with a non-circular but rotatable bar 318. Extending from the latter is a curved supporting arm 319 connected to the corresponding side of the rear panel 314. The springs 320 have a multiple function: They not only may be effective in aiding the movement of the panel 314 together with the rest of the top out of normal raised position toward elevated position, but also provide a movable pivot or axis about which the panel 314 may swing.

Furthermore, these springs may be effective in tending to counterbalance the weight of panel 314 to reduce the rapidity of its movement toward its lowered position and to assist in the upward movement of the panel into engagement with the shell T². Preferably, although not necessarily, the springs 320 may be arranged so that they tend to hold the raised panel in a position intermediate its temporary elevated position, shown in dot and dash lines, and its normal raised position, shown in full lines. The lowered panel, as shown, may rest against the inclined front wall of the storage compartment 331 and also against the cross member 329 at the rear of the seat back.

I claim:

1. In a vehicle body, the combination comprising a passenger compartment, a windshield, a rear deck behind said compartment and having a downwardly and rearwardly inclined outer wall, a shell movable from a raised position wherein it extends over the major portion of said compartment behind said windshield to a lowered position below said wall, and supporting and guiding structure for said shell, said structure being constructed to support the rear of the shell in a temporary position beyond its normal raised position, the front of the deck providing an opening through which the shell passes, and a closure movable to uncover or cover said opening when the rear of the shell is in said temporary position, the structure including cooperating parts on the shell and body which act as hold-down means for the rear of the shell when the latter is in normal raised position and which cooperate to elevate the shell from said normal position to its temporary position.

2. In a vehicle body, the combination comprising a passenger compartment, a windshield, a rear deck behind said compartment and having a downwardly and rearwardly inclined outer wall, a shell movable from a raised position wherein it extends over the major portion of said compartment behind said windshield to a lowered position below said wall, and supporting and guiding structure for said shell, said structure being constructed to support the rear of the shell in a temporary position beyond its normal raised position, the front of the deck providing an opening through which the shell passes, and a closure movable to uncover or cover said opening when the rear of the shell is in said temporary position, the structure including cooperating parts on the shell and body which act as hold-down means for the rear of the shell when the latter is in normal raised position and which cooperate to elevate the shell from said normal position to its temporary position, said parts including screw-threaded elements which act as jacks to elevate the rear of the top.

3. In a vehicle body, the combination comprising a passenger compartment, a windshield, a rear deck behind said compartment and having a downwardly and rearwardly inclined outer wall, a shell movable from a raised position wherein it extends over the major portion of said compartment behind said windshield to a lowered position below said wall, and supporting and guiding structure for said shell including guides within the deck and cooperating rolls on the shell, said structure being provided with means to impede the downward movement of the shell under the action of gravity when the shell is near the mid-portion of its path, said means being provided with relatively movable parts some of which have a gradual inclination in one direction and which provide opposite abutment surfaces, whereby relative movement in the said direction may readily occur and whereby relative movement in the opposite direction is impeded.

4. In a vehicle body, the combination comprising a passenger compartment, a windshield, a rear deck behind said compartment and having a downwardly and rearwardly inclined outer wall, a shell movable from a raised position wherein it extends over the major portion of said compartment behind said windshield to a lowered position below said wall, and supporting and guiding structure including guides providing at each side of the deck substantially parallel upwardly and forwardly inclined guide surfaces at the lower part of the path of the shell and providing upwardly inclined diverging surfaces at the upper part of said path.

5. In a vehicle body, the combination comprising a passenger compartment, a windshield, a rear deck behind said compartment and having a downwardly and rearwardly inclined outer wall, a shell movable from a raised position wherein it extends over the major portion of said compartment behind said windshield to a lowered position below said wall, and supporting and guiding structure including guide channels in the deck and rolls movable along said channels, said channels providing substantially parallel flanges at each side of the deck to engage the rolls and define a lower part of the path of the shell and providing upwardly diverging flanges defining the major portion of the upper part of said path.

6. In a vehicle body, the combination comprising a passenger compartment, a windshield, a rear deck behind said compartment and having a downwardly and rearwardly inclined outer wall, a shell movable from a raised position wherein it extends over the major portion of said compartment behind said windshield to a lowered position below said wall, and supporting and guiding structure including guide channels in the deck and rolls movable along said channels, said channels providing substantially parallel flanges at each side of the deck to engage the rolls and define a lower part of the path of the shell and providing upwardly diverging flanges defining the major portion of the upper part of said path, the substantially parallel flanges having a more moderate upward and forward inclination than either of the diverging flanges.

7. In a vehicle body, the combination comprising a passenger compartment, a windshield, a rear deck behind said compartment and having an outer wall, a shell movable from a raised position over said compartment to a lowered position below said wall, the rear of said shell having upstanding side walls, brackets extending outwardly from the lower parts of the rear of the shell, rolls mounted on said brackets, guides for the rolls inclining upwardly and forwardly within the deck, said guides being spaced laterally outward from said side walls, the guides and rolls cooperating in directing the shell between its raised and lowered positions, said rolls being concealed by the deck when the shell is in its raised position.

8. In a vehicle body, the combination comprising rear wheels, a passenger compartment, a rear deck behind said compartment, the deck having an outwardly bulged, downwardly and rearwardly inclined outer wall, housings disposed at the sides of the deck and providing enclosed spaces directly behind the rear wheels, said spaces communicating with the interior of the deck, movable top structure, in its raised position extending over said compartment, guiding and supporting means for the top structure, the top structure being movable into a lowered position beneath the deck wall and then having portions extending into said spaces behind the wheels, the bulged outer wall of the deck decreasing in width toward the rear so that the deck need not be objectionably bulky in appearance.

RAYMOND L. CARR.